United States Patent [19]

Kobayashi

[11] Patent Number: 4,998,519

[45] Date of Patent: Mar. 12, 1991

[54] FUEL SUPPLY CONTROL SYSTEM FOR AN ENGINE

[75] Inventor: Tomoya Kobayashi, Fuchu, Japan

[73] Assignee: Fuji Jukogyo Kabushiki Kaisha, Tokyo, Japan

[21] Appl. No.: 541,172

[22] Filed: Jun. 14, 1990

Related U.S. Application Data

[63] Continuation of Ser. No. 355,128, May 15, 1989, abandoned, which is a continuation of Ser. No. 154,746, Feb. 10, 1988, abandoned.

[30] Foreign Application Priority Data

Feb. 18, 1987 [JP] Japan .................................. 62-35103

[51] Int. Cl.$^5$ ............................................. F02D 33/00
[52] U.S. Cl. .................................................. 123/333
[58] Field of Search ................ 123/333, 332, 198 DB, 123/198 D

[56] References Cited

U.S. PATENT DOCUMENTS

| | | | |
|---|---|---|---|
| 4,058,106 | 11/1977 | Drews et al. | 123/333 |
| 4,506,638 | 3/1985 | Horii et al. | 123/333 |
| 4,598,679 | 7/1986 | Ohkumo et al. | 123/333 |
| 4,615,316 | 10/1986 | Yasuhara | 123/198 DB |
| 4,638,781 | 1/1987 | Shiki et al. | 123/333 |

Primary Examiner—Raymond A. Nelli
Attorney, Agent, or Firm—Martin A. Farber

[57] ABSTRACT

A fuel supply control system for an engine has an engine speed sensor for producing an engine speed signal and a sensor for sensing temperature of coolant and for producing a coolant temperature dependent on the temperature signal. A predetermined fuel cutoff engine speed, above which bouncing of intake and exhaust valves of the engine occurs, is set in accordance with the coolant temperature to a value which increases with increase of the temperature. When engine speed exceeds the fuel cutoff engine speed, the fuel supply is cut off.

3 Claims, 6 Drawing Sheets

FUEL SUPPLY CONTROL SYSTEM FOR AN ENGINE

RELATED APPLICATION

This application is a continuation of my co-pending application Ser. No. 07/355,128 (now abandoned) filed May 15, 1989 which in turn is a continuation of my co-pending application Ser. No. 07/355,128 (now abandoned) filed Feb. 10, 1988.

BACKGROUND OF THE INVENTION

The present invention relates to a fuel supply control system for an engine for motor vehicles.

A system in which the amount of fuel supplied to an engine is calculated based on amount of induced air, speed of engine, and other factors is known.

On the other hand, when the engine speed exceeds a predetermined value, intake and exhaust valves begin to bounce, which will cause misfiring and/or breakdown of the engine. In order to prevent such disadvantages, a fuel control system has a fuel cutoff system which operates when the engine speed exceeds a predetermined fuel cutoff speed which is slightly lower than the bounce beginning speed. However, in an automotive engine having a valve system provided with a hydraulic lash adjuster, if the engine is operated at a low temperature of the lubricating oil in cold engine state, the oil pressure in the hydraulic lash adjuster becomes very high because of high viscosity of the oil. Accordingly, the valves are lifted by the oil against springs, in a middle speed range, thereby holding the valves open. This causes the engine to stall, reduction of the power of the engine and rough idling.

Japanese Patent Application Laid-Open No. 59-208132 discloses a fuel cutoff system operated in which the fuel cutoff engine speed is set to a higher value in accordance with a temperature of coolant detected by a coolant temperature sensor for a set time after the start of an engine. However, since the high fuel cutoff engine speed is set, engine speed may exceed the bounce beginning speed to cause bouncing.

SUMMARY OF THE INVENTION

The object of the present invention is to provide a system which may prevent the bouncing of valves.

In the system of the invention, fuel cutoff is performed at an engine speed dependent on the temperature of coolant.

The other objects and features of this invention will become understood from the following description with reference to the accompanying drawings.

DETAILED DESCRIPTION OF THE PREFERRED EMBODIMENT

Figure 1:
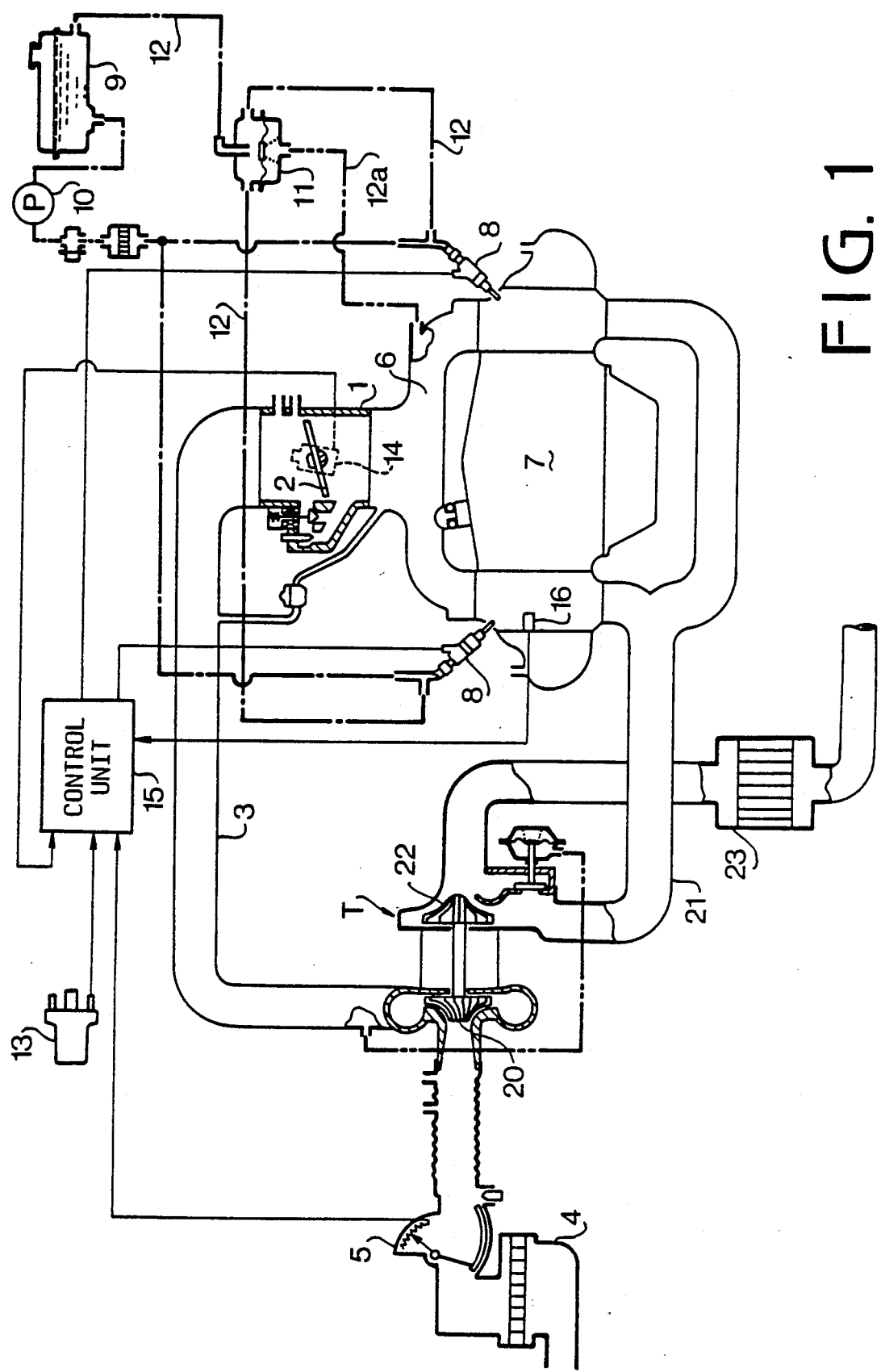
FIG. 1 is a schematic diagram showing a system of the present invention.

Referring to FIG. 1, an engine 7 has a throttle body 1 having a throttle valve 2 communicated with an intake pipe 3. In the intake system, an air cleaner 4, air flow meter 5, and compressor 20 of a turbocharger T are provided. The throttle body 1 is further communicated with an intake manifold 6 which is communicated with a combustion chamber of each cylinder (not shown) in the engine 7. In an exhaust pipe 21, an exhaust gas turbine 22 and a catalytic converter 23 are provided. Fuel is supplied to fuel injectors 8 from a fuel tank 9 by a fuel pump 10, and returned to the tank 9 through a passage 12 and a pressure regulator 11 which is opened by intake manifold pressure applied through a pipe 12a. A throttle position sensor 14 is provided in the throttle body 1 for detecting the throttle valve opening degree to detect engine operating conditions. A coolant temperature sensor 16 is provided in the engine 7 for detecting the temperature of the coolant. The coolant temperature sensor 16 produces an output signal, the voltage of which is dependent on the temperature. Output signals of the sensors 14 and 16 are applied to a control unit 15 for controlling fuel injectors 8. The control unit 15 is further applied with a signal from the air flow meter 5 and with a pulse signal from an ignition coil 13 responsive to the engine speed.

Figure 2:
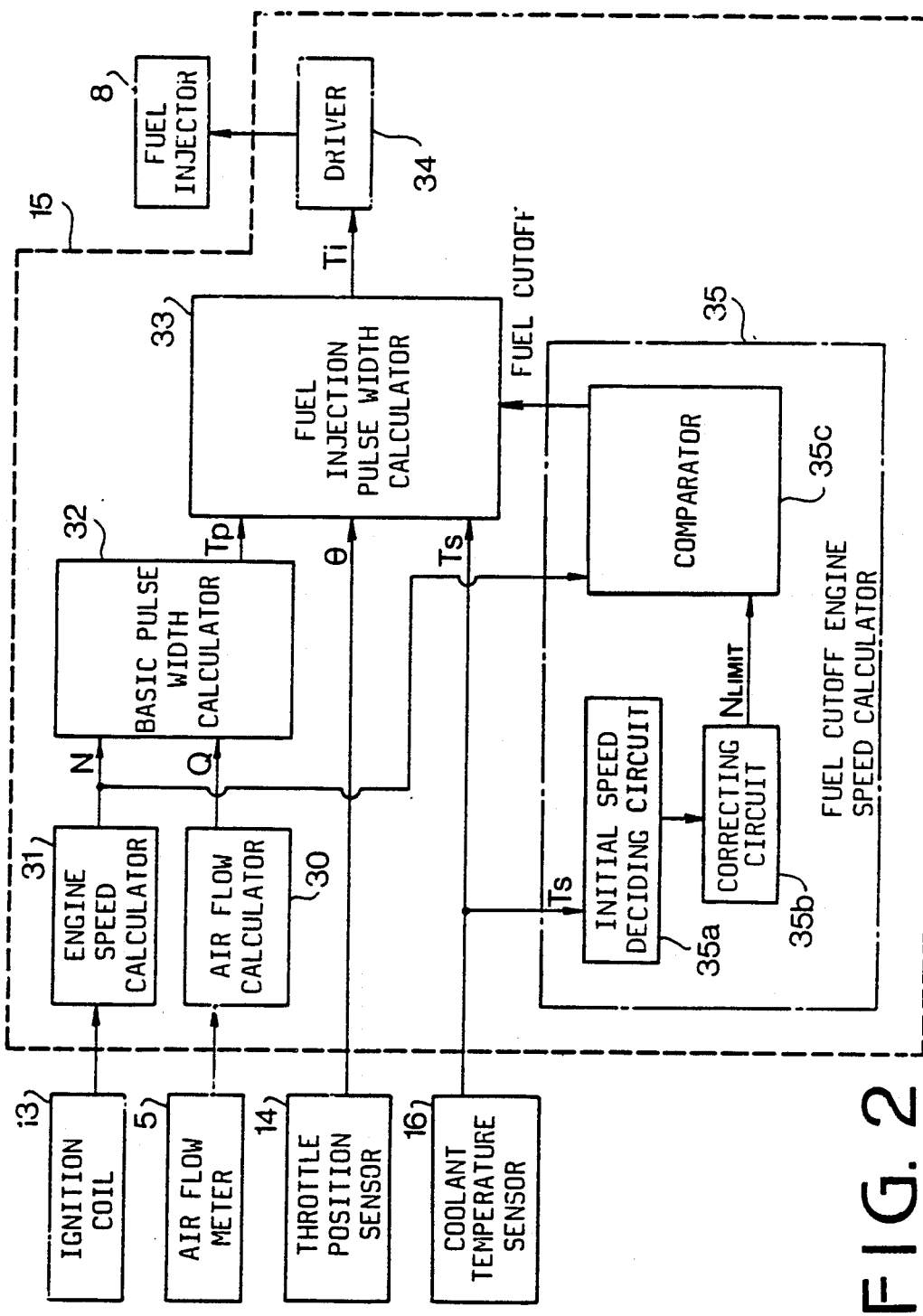
FIG. 2 is a block diagram of a control system of the present invention.

Referring to FIG. 2 showing the control unit 15, the output signal of the ignition coil 13 is fed to an engine speed calculator 31 which produces an engine speed signal N dependent on engine speed, and the output signal of the air flow meter 5 is fed to an air flow calculator 30 which produces a mass air flow signal Q. Output signals of both calculators 31 and 30 are fed to a basic injection pulse width calculator 32 for calculating a basic pulse width Tp. The output signal Tp is applied to a fuel injection pulse width calculator 33. The output signal $\theta$ of throttle position sensor 14 and the output signal Ts of coolant temperature sensor 16 are also applied to the calculator 33. The calculator 33 corrects the basic pulse width Tp in accordance with output signals of throttle position sensor 14 and coolant temperature sensor 16. A corrected fuel injection pulse width signal Ti is applied to fuel injectors 8 through a driver 34 to inject the fuel to operate the engine.

In order to cut off the fuel supply before the bounce begins, a fuel cutoff engine speed calculator 35 is provided for producing a signal for cutting off the fuel supply in accordance with the engine speed N and the coolant temperature Ts. The fuel cutoff engine speed calculator 35 comprises an initial speed deciding circuit 35a which is applied with the signal Ts from the coolant temperature sensor 16 to determine fuel cutoff initial engine speed, a correcting circuit 35b, and a comparator 35c which is supplied with the signal N from the engine speed calculator 31 and with the output signal of circuit 35b. In the initial speed deciding circuit 35a, an initial engine speed Nlimit is determined in accordance with the coolant temperature Ts at the start of the engine.

Figure 3:
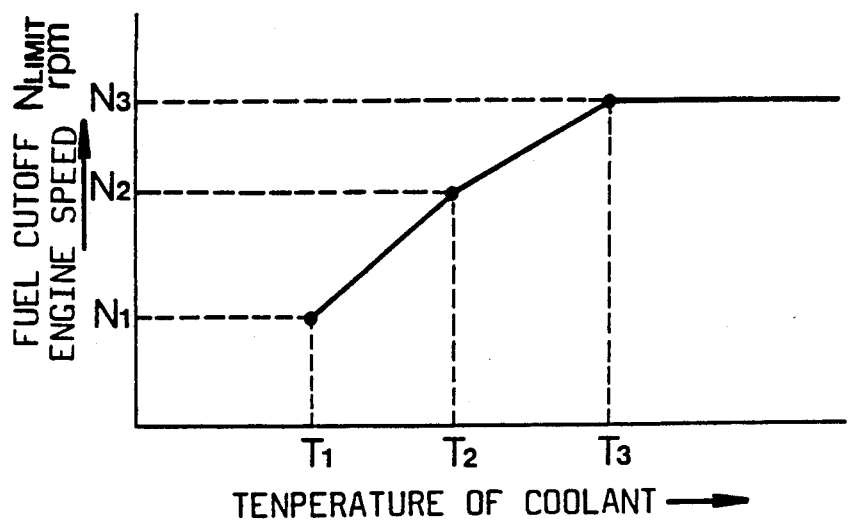
FIG. 3 is a graph showing the relationship between temperature of coolant and engine speed initial value for cutting off fuel.

FIG. 3 shows an example of a lookup table formed in a memory of circuit 35 storing the initial engine speed for cutting off the fuel. Engine speeds N1, N2 and N3 corresponding to the coolant temperatures T1, T2 and T3 are stored in the memory, as initial engine speed Nlimit. Above temperature T3, the engine speed N3 does not increase. The output signal of the circuit 35a is applied to the deciding circuit 35c through the correcting circuit 35b. When the engine speed N is higher than the initial speed Nlimit 1 (N ≧ Nlimit 1), the comparator 35c produces a fuel cutoff signal. In response to the fuel cutoff signal, the calculator 33 produces a signal which represents that the fuel injection pulse width Ti is zero. Thus, the fuel injectors 8 stop injecting. Accordingly, the bouncing of valves can be prevented. The correcting circuit 35b is provided for increasing the initial speeds Nlimit 1 at regular intervals, for example, at every 20 seconds, by 200 rpm (Nlimit +200 rpm).

The operation of the system will be described with reference to flow charts of FIGS. 5a to 5c.

Figure 5A:
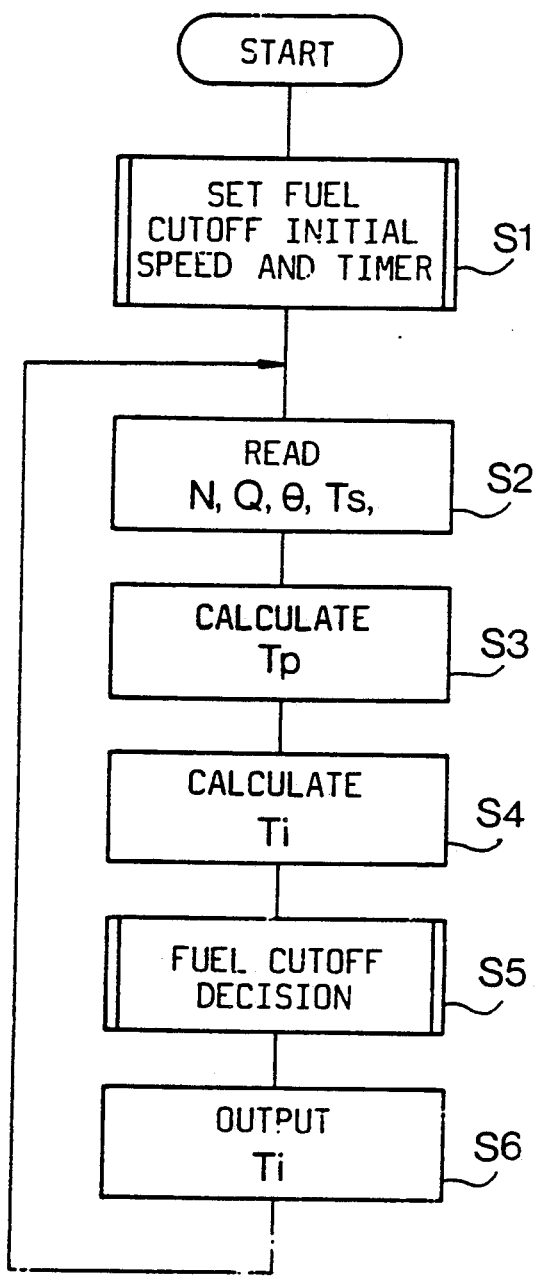
FIGS. 5a, 5b and 5c are flow charts showing operations of the control system.

Referring to FIG. 5a showing a main routine of the control unit 15, fuel cutoff initial speed and a timer are set at a step S1. At a step S2, engine speed N produced from the calculator 31, mass air flow Q from the calculator 30, throttle opening degree θ from the sensor 14 and coolant temperature Ts from the sensor 16 are read. At a step S3, basic fuel injection pulse width Tp is calculated at the calculator 32 dependent on engine speed N and mass air flow Q. At a step S4, fuel injection pulse width Ti is calculated in the calculator 33 dependent on Tp, θ and Ts. At a step S5, engine speed N is compared with fuel cutoff initial speed Nlimit, and decision of fuel cutoff is made. If fuel cutoff is decided, fuel cutoff signal of the calculator 35 is fed to the calculator 33 for producing fuel injection pulse width signal Ti which is applied to the driver 34 for cutting off the fuel (step S6).

Figure 5B:
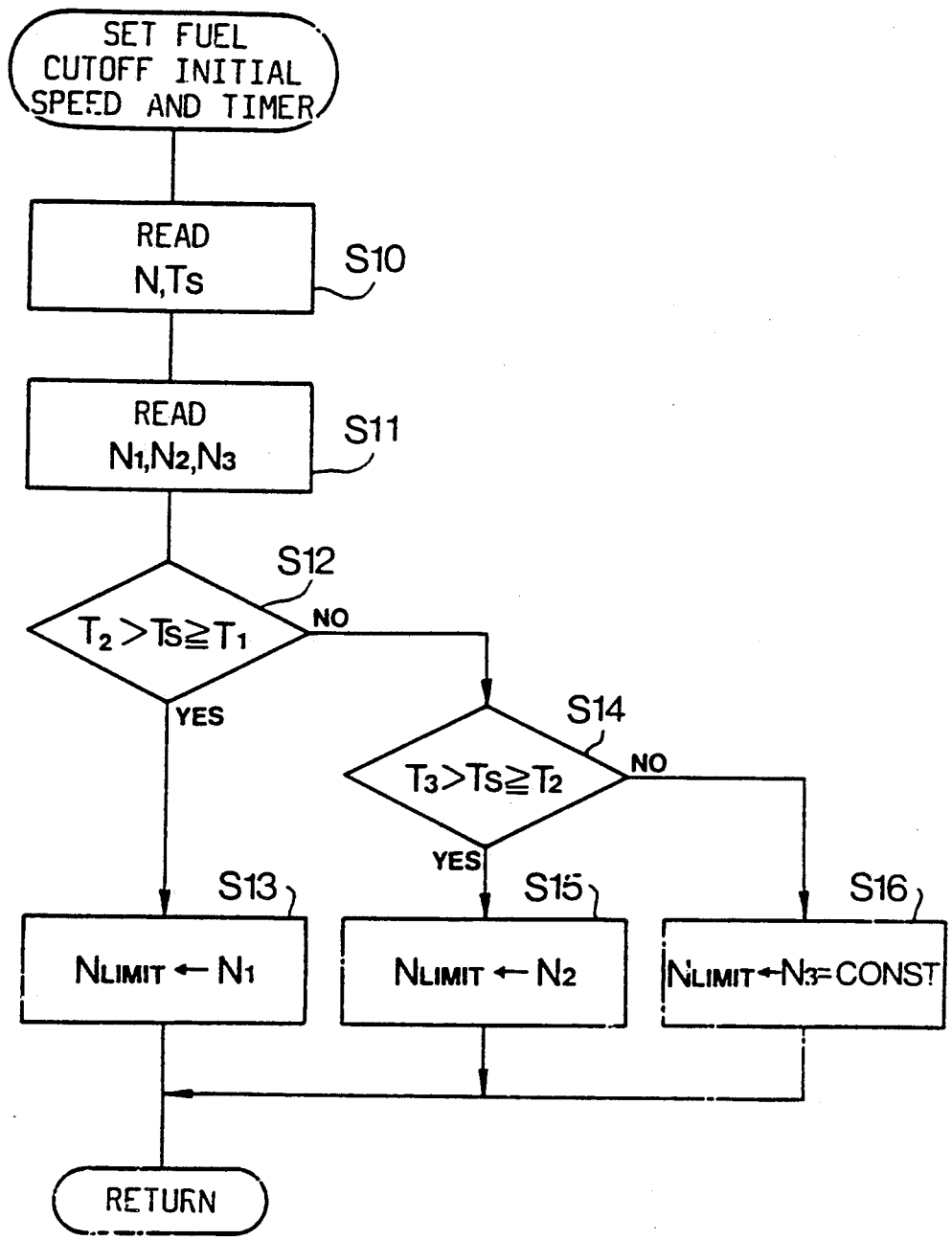

FIG. 5b shows a routine for providing fuel cutoff initial speed at the step S1 of FIG. 5a. At a step S10, engine speed N from the circuit 31 and coolant temperature Ts from the sensor 16 are read. At a step S11, an initial speed Nlimit corresponding to coolant temperature Ts is derived from the table shown in FIG. 3. It is determined whether the detected temperature Ts is higher than T1 or lower than T2 (T2 > Ts ≧ T1) at a step S12. When T2 > Ts ≧ T1, engine speed N1 is determined as initial speed Nlimit at a step S13. When the temperature Ts is out of the range between T1 and T2, the program proceeds to a step S14. When T3 > Ts ≧ T2 at step S14, initial speed N2 L is determined at a step S15. When Ts T3, constant speed N3 is determined at a step S16.

Figure 4:
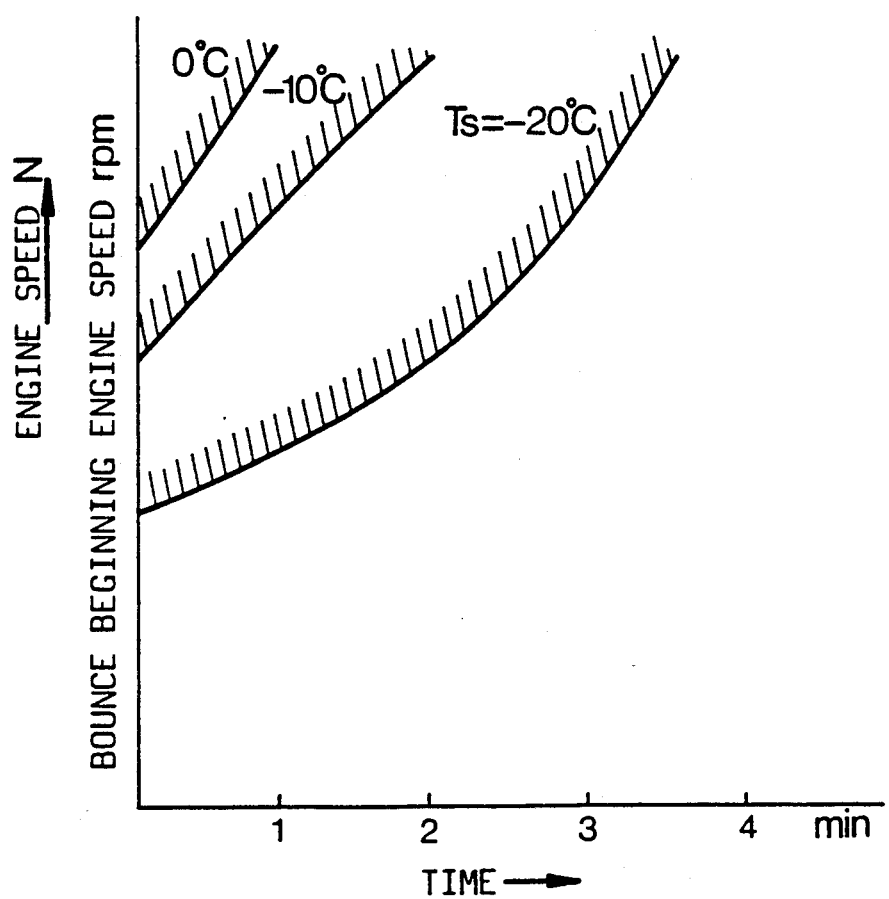
FIG. 4 is a graph showing the relationship between engine speed and temperature of coolant with respect to the time.
Figure 5C:
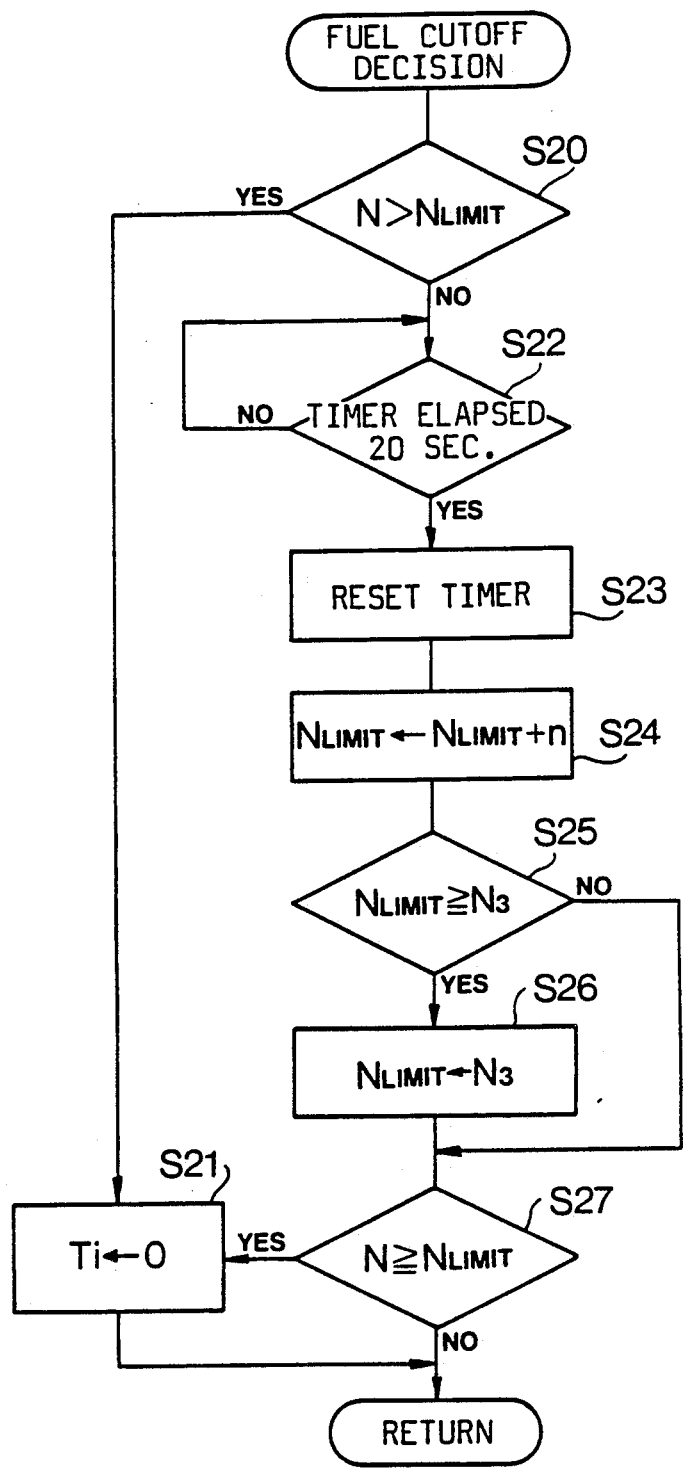

FIG. 5c shows a routine for the fuel cutoff decision at the step S5 of FIG. 5a. At a step S20, when N > Nlimit, the fuel cutoff signal of the calculator 35 is applied to the calculator 33 in which the fuel injection pulse width is calculated to be zero. Thus, the fuel supply is cutoff at a step S21. When N < Nlimit at the step S20, and when time dependent on the timer elapses 20 seconds at a step S22, the timer is reset at a step S23. At a step S24, the initial speed Nlimit is increased by adding n(200 rpm) in the circuit 35b. Thus, the Nlimit is corrected by adding correct engine speed (200 rpm) at every 20 seconds after the start of the engine. As shown in FIG. 4, since the bounce beginning speed varies in accordance with the temperature of the coolant and the elapsed time after the start of the engine, the correction engine speed n is determined with respect to the coolant temperature at the start of the engine as follows.

| temperature of coolant at the start of the engine Ts | correction engine speed n |
|---|---|
| −20° C. | 200 rpm (n1) |
| −10° C. | 400 rpm (n2) |

At a step S25, the corrected initial speed Nlimit is compared with the initial speed N3 corresponding to the coolant temperature T3. When the initial speed is larger than the corrected speed (Nlimit N3) and when N ≧ Nlimit at a step S27, the program proceeds to the step S21. When Nlimit ≧ N3 at the step S25, the initial speed Nlimit is fixed to N3 at a step S26.

In the system of the present invention, the fuel cutoff engine speed is set to a value slightly lower than the bounce beginning engine speed.

Although the above described system is provided with fuel injectors, the invention can be applied to an engine having a carburetor.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. In a system for cutting off the fuel supply of an engine having a fuel supply means, said system comprising an actual engine speed detector means for producing an engine speed signal dependent on said actual engine speed, comparing means for comparing said actual engine speed signal and a fuel cutoff engine speed signal and producing a fuel cutoff signal when said actual engine speed signal exceeds said fuel cutoff engine speed signal, and means responsive to said fuel cutoff signal for cutting off the fuel supply by the fuel supply means, the improvement comprising temperature detector means for producing a coolant temperature signal dependent on coolant temperature at the start of the engine, setting means responsive to said coolant temperature signal for setting an initial value of said fuel cutoff engine speed at the start of the engine, said initial value being represented as an increasing function with increase of said coolant temperature, and correction means for correcting said fuel cutoff engine speed to increase said fuel cutoff engine speed from said initial value in response to elapsed time after the start of the engine independent of coolant temperature.

2. The system according to claim 1, further comprising means for setting a maximum value of said fuel cutoff engine speed, and said correction means determines an increasing rate of said fuel cutoff engine speed in response to said coolant temperature at the start of the engine and corrects said fuel cutoff engine speed to increase from said initial value to the maximum value with said increasing rate.

3. The system according to claim 1, wherein said initial value of said fuel cutoff engine speed is constant at coolant temperatures higher than a predetermined temperature.

* * * * *